United States Patent
Huang et al.

(10) Patent No.: US 9,319,635 B2
(45) Date of Patent: Apr. 19, 2016

(54) WINDOW BLANKING FOR PAN/TILT/ZOOM CAMERA

(71) Applicant: Pelco, Inc., Clovis, CA (US)

(72) Inventors: Chien-Min Huang, Clovis, CA (US); Farzin Aghdasi, Clovis, CA (US); Zhan Jiang Ma, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 267 days.

(21) Appl. No.: 13/690,244

(22) Filed: Nov. 30, 2012

(65) Prior Publication Data

US 2014/0152815 A1  Jun. 5, 2014

(51) Int. Cl.
| | | |
|---|---|---|
| H04N 9/47 | (2006.01) | |
| H04N 7/18 | (2006.01) | |
| H04N 5/232 | (2006.01) | |
| H04N 21/454 | (2011.01) | |

(52) U.S. Cl.
CPC ............. *H04N 7/18* (2013.01); *H04N 5/23206* (2013.01); *H04N 5/23238* (2013.01); *H04N 5/23296* (2013.01); *H04N 21/4542* (2013.01)

(58) Field of Classification Search
CPC . H04N 21/4542; H04N 7/18; H04N 5/23296; H04N 5/23238; H04N 5/23206
USPC .................... 348/143, 147, 144, 151; 386/226
See application file for complete search history.

(56) References Cited

U.S. PATENT DOCUMENTS

| | | | |
|---|---|---|---|
| 7,161,615 B2 | 1/2007 | Pretzer et al. | |
| 7,382,400 B2 | 6/2008 | Sablak | |
| 7,742,077 B2 | 6/2010 | Sablak et al. | |
| 7,742,656 B2 * | 6/2010 | Lee | ................................ 382/283 |
| 7,839,431 B2 | 11/2010 | Swarr et al. | |
| 8,098,282 B2 | 1/2012 | Gopinath et al. | |
| 8,212,872 B2 | 7/2012 | Sablak | |
| 2004/0100563 A1 | 5/2004 | Sablak et al. | |
| 2005/0185058 A1 | 8/2005 | Sablak | |
| 2005/0270371 A1 | 12/2005 | Sablak | |
| 2005/0275723 A1 | 12/2005 | Sablak et al. | |
| 2005/0280707 A1 | 12/2005 | Sablak et al. | |
| 2006/0192853 A1 | 8/2006 | Lee | |
| 2007/0115356 A1 | 5/2007 | Kang et al. | |

(Continued)

OTHER PUBLICATIONS

Notification of Transmittal of the International Search Report and the Written Opinion of the International Searching Authority, or the Declaration for PCT/US2013/066801, "Window Blanking for Pan/Tilt/Zoom Camera", Date of mailing: Nov. 4, 2014.

(Continued)

*Primary Examiner* — Robert Chevalier
(74) *Attorney, Agent, or Firm* — Hamilton, Brook, Smith & Reynolds, P.C.

(57) ABSTRACT

Network cameras employing advanced video analytics are increasingly being used in both public and private settings. Unlike fixed surveillance cameras, pan/tilt/zoom cameras provide a dynamic field-of-view. Some regions within a given field-of-view can be designated as private and may not be recorded. A window-blanking feature, according to an embodiment of the invention, enables an ability to block out defined portions of the video where a privacy zone may otherwise appear. Through use of the embodiment, consistent privacy is provided during dynamic surveillance to ensure compliance with privacy regulations or contractual arrangements relating to use of a surveillance camera having a privacy zone within the given field-of-view.

19 Claims, 8 Drawing Sheets

(56) References Cited

U.S. PATENT DOCUMENTS

| | | |
|---|---|---|
| 2007/0116328 A1 | 5/2007 | Sablak et al. |
| 2008/0094480 A1 | 4/2008 | Swarr et al. |
| 2009/0015670 A1 | 1/2009 | Gopinath et al. |
| 2010/0149330 A1 | 6/2010 | Salgar et al. |
| 2012/0081552 A1 | 4/2012 | Sablak et al. |
| 2012/0098854 A1 | 4/2012 | Ohnishi |
| 2012/0098927 A1 | 4/2012 | Sablak |
| 2012/0169871 A1 | 7/2012 | Sablak et al. |

OTHER PUBLICATIONS

Notification Concerning Transmittal of International Preliminary Report on Patentability for PCT/US2013/066801, "Window Blanking for Pan/Tilt/Zoom Camera", Date of mailing: Jun. 11, 2015.

* cited by examiner

WINDOW BLANKING FOR PAN/TILT/ZOOM CAMERA

BACKGROUND

A surveillance pan/tilt/zoom (PTZ) camera can pan, tilt and zoom to cover a very large area. Very often, many areas within a field-of-view of a camera are private areas, or off-limits, to the camera and are not allowed to be viewed or recorded. Current fixed camera systems can apply a privacy mask to an area designated as private. When a camera's position changes, however, the private areas are vulnerable to being unmasked. Attempts at tracking a privacy mask while the camera moves are insufficient due to varying speeds cameras can move. Most traditional systems reveal a designated private area when the camera is in motion and only redraw the privacy mask once the camera becomes stationary.

SUMMARY

A window-blanking feature allows a user to block out a section of a camera's field-of-view for privacy reasons, such as in the case of a private residence that is within a field-of-view of the camera. The embodiments described below provide a method, or corresponding apparatus or system, for a pan/tilt/zoom (PTZ) camera to block out the video corresponding to those designated private areas. The PTZ camera may also be configured to block out the areas of video generating a noisy scene, resulting in poor tracking performance.

The systems and methods described herein address the issues of revealing a privacy zone when a camera's state is modified, such as its pan angle, tilt angle or zoom magnification. In one embodiment, pixels on an image plane of a stationary or PTZ camera may be mapped to a world coordinate system. The corresponding world coordinates may be mapped back to the image coordinates for the camera's updated state. In one embodiment, this mapping can be pre-computed and stored as a conversion look-up table. In this way, both slow and fast movements of the camera may maintain an accurate blanking area (i.e., the privacy region of interest is consistently maintained regardless of the camera's state). Furthermore, traditional systems only handle a limited number of defined privacy areas (usually fewer than eight) and are further limited to rectangular shapes for defined privacy areas. The systems and methods described below can handle a plurality, including eight or more, of polygon shapes through interpolation.

A method of window-blanking for a camera or image sensor may include computing an absolute pan/tilt angle relative to world ground coordinates for each vertex of a privacy zone within a field-of-view for the camera. The method may also determine coordinates for each vertex based on an updated or predicted camera field-of-view and block-out the privacy zone using the coordinates for each vertex. Window blanking may also include calculating the pan/tilt angles for each vertex of the privacy zone based, at least in part, on an internal camera location and an external camera location, wherein the internal camera location is defined by a pan attribute, tilt attribute, and zoom attribute and an external camera location is defined relative to the world ground coordinate by an x-attribute, y-attribute and height attribute.

In one embodiment, an adjusted pan/tilt angle for each vertex of the privacy zone may be determined. With a determined adjusted pan/tilt angle, the window blanking method may generate a predictive pan/tilt adjustment angle for each vertex in the privacy zone as a function of the adjusted pan/tilt angle. Window blanking may also include effecting a blocking-out mode to an adjusted privacy zone area. For example, blocking-out may include the application of a scanline polygon fill. In one embodiment, a privacy zone demarcation input for blocking-out the privacy zone may be received from a client device.

The window blanking process may also include a mapping application to obtain the privacy zone demarcation input. In one embodiment, a panoramic image from a PTZ camera may be provided to a user, enabling the user to interact with the panoramic image as an interface for defining the privacy zone through a defined input mode. The window blanking process may also provide a selection of layers, including a panoramic image layer, map layer, hybrid panoramic image map layer, and annotations layer, with the panoramic image interface. These layers provide the ability to engage the panoramic interface via a selection mode, draw mode and gesture mode as available input modes.

In one embodiment, blocking-out the privacy zone using the coordinates for each vertex includes applying window-blanking at the camera. Applying window-blanking at the camera may include sending a data stream from the camera before encoding or compressing the data stream. In one embodiment, the data stream may include an analog data stream or a digital data stream, or a combination thereof. The window-blanking method may calculate pan/tilt angles by considering ground coordinates, rotations or translations of camera coordinates, or redactions from one or more users. In one embodiment, determining coordinates may include calculating no coordinate transformation, image coordinates or pan/tilt/zoom coordinates. The window-blanking may include obtaining a panoramic image for a pan/tilt/zoom camera, enabling a user to define at least one blanking zone within the panoramic image and storing vertices of the at least one blanking zone in a manner that enables blanking of the at least one blanking zone during imaging by the camera.

A system for window blanking may include an image sensor, such as a pan/tilt/zoom camera, having a non-transitory computer memory storing thereon program instructions. The program instructions are loadable and executable by a processor, and, when executed, cause the processor to compute an absolute pan/tilt angle relative to world ground coordinates for each vertex of a privacy zone within a field-of-view for the image sensor or camera; determine coordinates for each vertex based on an updated or predicted image sensor or camera field-of-view and block-out the privacy zone using the coordinates for each vertex. The system may also comprise a privacy engine stored in the computer memory, wherein the privacy engine includes a component set. In one embodiment, the component set may include a window blanking component, coordinates component, mapping component, camera component, encoder component, and/or a user interface component. The privacy engine may simultaneously adjust the privacy zone with movement of the image sensor or camera. Additionally, an interface to interact, modify and/or adjust settings associated with window blanking and the privacy engine may be accessible through a remote client device.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
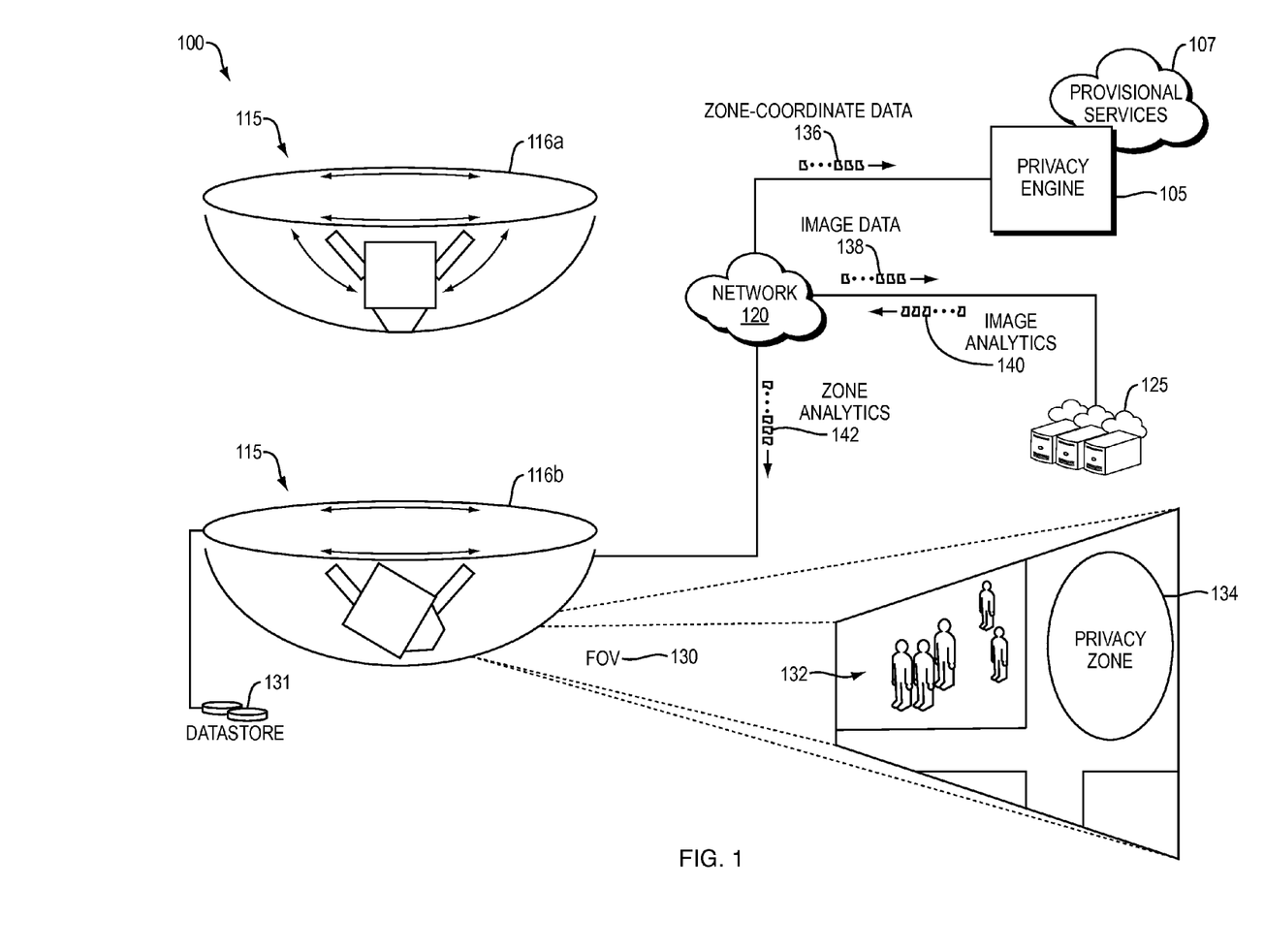
FIG. 1 is a schematic diagram of a camera system for window blanking according to one embodiment.

A description of embodiments follows. FIG. 1 illustrates a network 100 that includes camera system 115 that provides a window blanking feature according to one embodiment of the present invention. As illustrated in FIG. 1, the camera system 115 in a first orientation 116a, is in communication with a privacy engine 105. The privacy engine may include one or more provisioned services 107 that are provided through or by a network 120 and one or more provisioning servers 125. The communications network 120 may establish communication between the camera 115 and the privacy engine or data center by using one or more protocols such as Transmission Control Protocol/Internet Protocol (TCP/IP), Internet Protocol Secure (IPSec), or the like. In one embodiment, the camera system may include a high-speed system with a built-in network interface, such as 100 base-TX, for live streaming to request network application(s).

When in use, the camera system 115 may undergo a pan/tilt/zoom operation. The adjusted camera orientation 116b includes at least one tilt position at approximately 45°. Also illustrated in FIG. 1, the camera system 115 is in communication with or includes a data store 131. The camera system 115 may include a field-of-view 130, and within the field-of-view there may be one or more zones 132, 134. According to one embodiment, a first zone 132 may include or be defined as a public zone. A second zone 134 may be labeled as a privacy zone.

The camera system 115 includes optics and other attributes. For example, the camera system 115 may include a signal format attribute, scanning system attribute, image sensor attribute, horizontal resolution attribute, lens attribute, zoom attribute, zoom speed (optical range) attribute, horizontal angle of view attribute, horizontal focus attribute, maximum sensitivity attribute, sync system attribute, white balance attribute, shutter speed, iris control attribute, gain control attribute, video output attribute, video signal-to-noise attribute, wide dynamic range attribute, electronic image stabilization attribute, image enhancement attribute, and/or video motion detection attribute. The camera may also include various video attributes, for example, the camera may include a video encoding attribute, video streams attribute, frame rate attribute, available resolutions attribute, supported protocols attribute, users attribute, security access attribute and/or software interface attribute. In one embodiment, the security access attribute may support multilevel password protection. Settings for the above-noted attributes may be adjusted by the camera component through the user interface described in detail below in reference to FIG. 2.

According to one embodiment, the camera system 115 may provide an interface (not shown) to control and monitor video over Internet protocol (IP) networks. The camera system 115 may also provide an interface to control simultaneous IP and analog video feeds. In one embodiment, the camera system may permit an interface to view and control analog video while reviewing, recording, and controlling network IP video. Formats supported by the camera system may include, but are not limited to, H.264, MPEG-4, and MJPEG compression. In addition, the camera system may support one or more simultaneous video streams. The two streams can be compressed in MJPEG, MPEG-4, and H.264 formats across several resolution configurations. Streams can be configured in a variety of frame rates, bit rates, and a group of pictures (GOP) structures for additional bandwidth administration. Bandwidth administration may include the selection of the H.264 compression standard, where the video files are up to 20 times smaller than MJPEG, making network video storage more computationally inexpensive.

Referring now to the data flow illustrated in FIG. 1, zone coordinate data 136 may be transmitted from one or more camera systems to the privacy engine 105. In one embodiment, the privacy engine may distribute the zone coordinate data to one or more servers 125 over the network 120. The zone coordinate data may be processed by the privacy engine 105. Processed zone coordinate data may include zone analytics for transmission to the camera 142. In one embodiment, the camera system 115 may also transmit image data 138 over the network to the data center. The data center may process the image data from the privacy engine 105 and may generate image analytics 140. These image analytics may include, but are not limited to, object detection including abandoned object detection, adaptive motion detection, auto tracking, camera sabotage, directional motion, loitering detection, object counting, object removal, and stopped vehicle.

Figure 2:
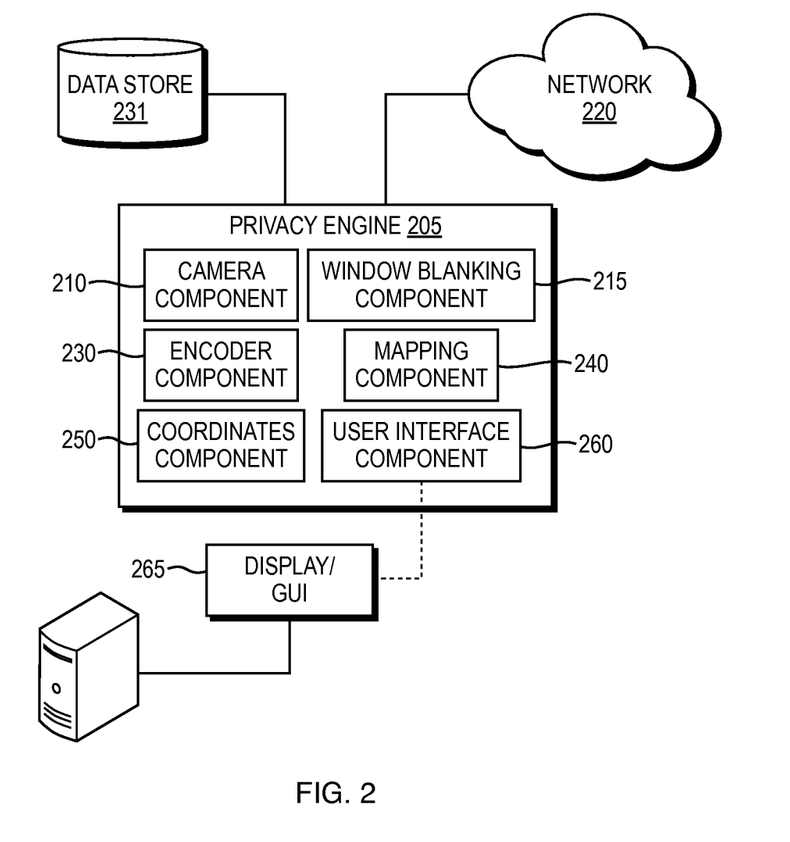
FIG. 2 is a schematic diagram illustrating one embodiment of a software architecture.

FIG. 2 illustrates one embodiment of a software architecture for the camera system with window blanking of FIG. 1. As illustrated in FIG. 2, a privacy engine 205 is in communication with a network 220 and a data store 231. Networks commonly recognized as having an interconnection and interoperation of clients, servers, and intermediary nodes in a graph topology. It should be noted that the term "server" as used herein refers generally to a computer, other device, program, or combination thereof that processes and responds to the requests of remote users across a communications network. Servers serve their information to requesting "client(s)". The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Network card(s) may accept, communicate, and/or connect to a communications network 220. Through a communications network 220, the privacy engine is accessible through remote clients (e.g., computers with web browsers) by users. Should processing requirements dictate a greater amount speed and/or capacity, distributed network controllers (e.g., Distributed privacy engine), architectures may similarly be employed to pool, load balance, or otherwise increase the communicative bandwidth required by the privacy engine.

The privacy engine 205 may include a camera component 210, window blanking component 215, encoder component 230, mapping component 240, coordinates component 250, user interface component 260, and/or display/GUI component 265. The engine(s) and component(s) may access, call, use, and/or invoke other engine(s) and component(s) to provide for a distributed and non-hierarchical software architecture.

The camera component 210 may be in communication with the camera system of FIG. 1. In one embodiment, the camera component 210 may receive image data and/or zone coordinate data from the camera system of FIG. 1. The camera component may transfer data received from the camera or update other components in the privacy engine and may also send the image data and or zone coordinate data to other applications outside of the privacy engine, e.g., third party applications.

The window blanking component 215 may also receive zone coordinate data and image data from the camera component and/or the camera system of FIG. 1. In one embodiment, the window blanking component may effect the blanking of a privacy zone based on current coordinates for the camera and vertices associated with the privacy zone. The window blanking component may also receive an adjusted camera position and thereby adjust the window blanking zone or privacy zone for the interface displaying the camera's field-of-view. Effecting the blocking out of a privacy zone may be accomplished when received by the privacy engine residing at a server on the network. In one embodiment, the privacy engine may be specifically programmed to apply window blanking at the camera or sensor device. For example, a Complementary Metal Oxide Semiconductor (CMOS) may include an array of pixels configured to register or read light information from a field-of-view when a shutter opens. The registration of light information may be continuous, periodic, alarm-based, or pre-determined temporal setting. In one embodiment, the values of individual pixels on the pixel array may be configured to register a specific intensity value regardless of the light information received when the shutter opens. The privacy zone may be thereby set in real-time on the image plane. Image plane coded implementations do not suffer from the lag in complex graphic transformation computations and also reduce the possibility of having information or imagery representing objects or activities in a privacy zone.

The encoder component 230 may receive analog video from the camera system and encode the analog video into one or more preselected formats. For example, the encoder component may receive two simultaneous streams from the camera and encode them from the received format to a predetermined format. In one embodiment, the predetermined format may be selectable by a user. The predetermined format for each stream may also be automatically optimized based on the complexity of window blanking. The complexity of window blanking may be based, at least in part, on the number of defined privacy zones and/or the types and/or number of different polygon shapes. For example, overlapping privacy zones for a given stream may optimize by effecting the blocking out of mutually exclusive portions of each privacy zone. In situations where a stream includes a privacy zone that is a subset of a larger privacy zone, the format for the stream may optimize by effecting the blocking out of the larger privacy zone.

The mapping component 240 may receive image data, image coordinate values, world coordinate values, zone coordinate values, from the camera system and/or the privacy engine. Upon an adjustment to either the image coordinate or the world coordinate, the mapping component may dynamically determine projected coordinates and vertices values and adjust the values to send to the window blanking component so that an adjusted privacy zone may be applied to the field-of-view being displayed by the user interface component 260. As noted above, the mapping component may include a mapping application to obtain the privacy zone demarcation input. In one embodiment, a panoramic image from a PTZ camera may be provided to user, enabling the user to interact with the panoramic image as an interface for defining the privacy zone through a defined input mode. The window blanking process may also provide a selection of layers, including a panoramic image layer, map layer, hybrid panoramic image map layer, and annotations layer, with the panoramic image interface. These layers provide the ability to engage the panoramic interface via a selection mode, draw mode and gesture mode as available input modes. A selection mode may enable the selection of predetermined areas or regions as privacy zones via a drop down menu, checkbox or the like. A draw mode may enable the drawing of a privacy zone through an input device such as a mouse or a touch interface. A gesture mode may enable the receipt of gestural input, e.g., human gestures including movement of the body, hands and/or facial expressions, to identify a privacy zone. Gestural input may be received through sensor devices programmed to detect behavioral motion.

The coordinates component 250 may receive or transmit image coordinate and/or world coordinate values to and from any of the components within or associated with the privacy engine. In one embodiment, the coordinates component may continuously poll the camera system for updated positioning information. The camera system may also be programmed to transmit positioning system updates to the coordinates component in real time.

The user interface component 260 may be optionally connected to a remote display/GUI 265, wherein the display/GUI is in communication with the client computer having a processor, memory, and I/O peripherals for receiving input and output from an operator. User interface component may provide an option to adjust the window blanking component based settings on an editable privacy zone. In one embodiment, the user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities or the like. In one embodiment, the user interface may include a web application viewable through a web browser.

A user interface component 260 is a stored program component that is executed by a CPU. The user interface may be a conventional graphic user interface as provided by, with, and/or atop operating systems and/or operating environments such as examples described above. Privacy engine components, such as the user interface, may be consolidated and/or distributed in countless variations through standard data processing and/or development techniques. Multiple instances of any one of the program components in the program component collection may be instantiated on a single node and/or across numerous nodes to improve performance through load-balancing and/or data-processing techniques. Furthermore, single instances may also be distributed across multiple controllers and/or storage devices; e.g., databases.

The structure and/or operation of privacy engine may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. Instances of privacy engine components consolidated into a common code base from the program component collection may communicate, obtain, and/or provide data. This may be accomplished through intra-application data processing communication techniques, such as, but not limited to: data referencing (e.g., pointers), internal messaging, object instance variable communication, shared memory space, variable passing, and/or the like.

Figure 3A:
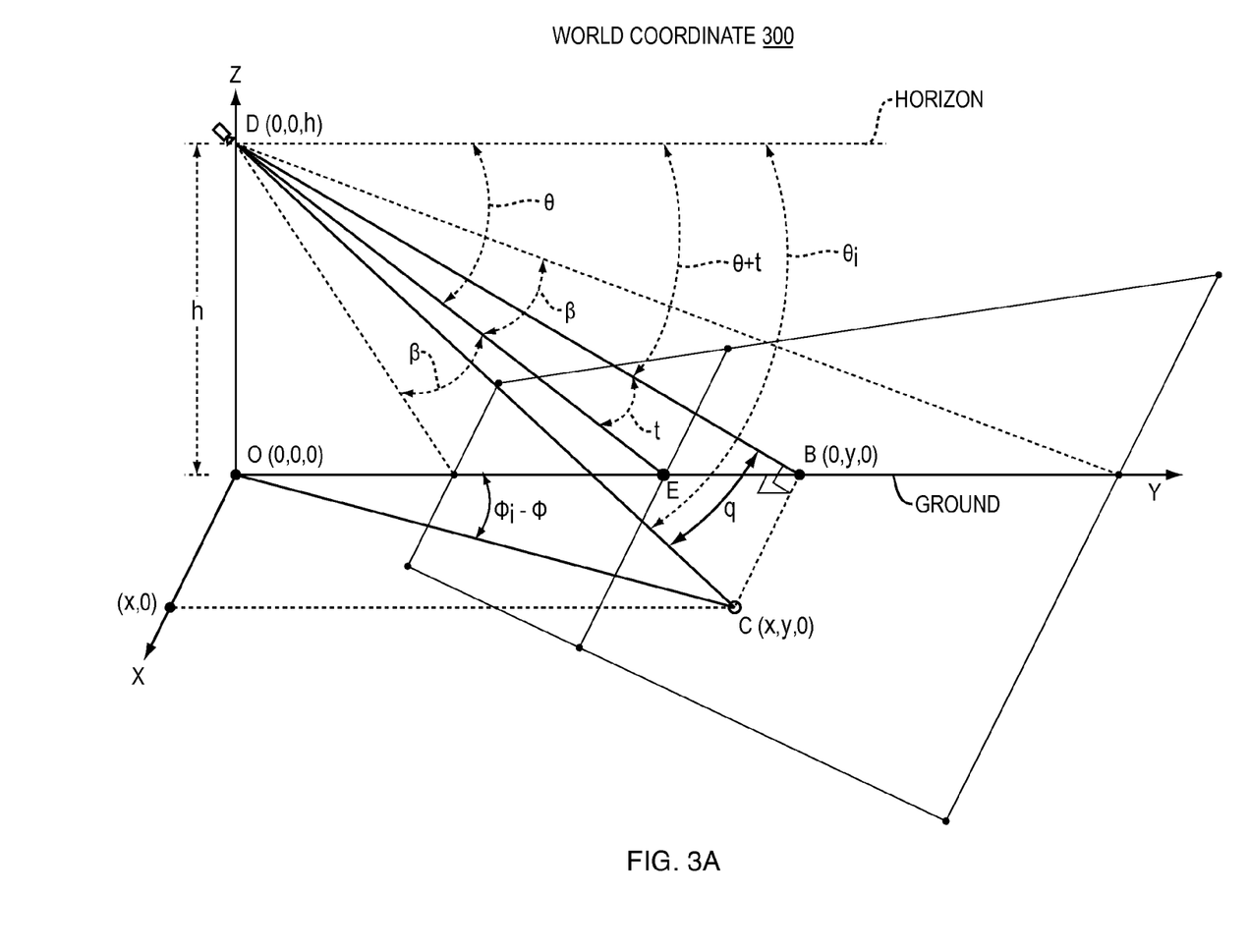
FIG. 3A is a graph diagram illustrating one embodiment of mapping using coordinate system for window blanking.

FIG. 3A is a graph diagram 300 illustrating one embodiment of mapping using a coordinate system for window blanking. As illustrated in FIG. 3, three coordinates may be used to accomplish window blanking. One coordinate is the world ground coordinate (X, Y, Z). World ground coordinate may include any form of coordinate system. In one embodiment, the world ground coordinate system is common to other camera systems and not necessarily tied to a specific world (i.e., earth geography). It is assumed that the ground level is flat. The Z-axis of the world ground coordinate is perpendicular to the ground level, and the z value is zero at ground level. Another coordinate is the image coordinate (U, V), that is, the image seen in the master camera. Another coordinate is the camera pan/tilt coordinate ($\phi$, $\theta$), where $\phi$ and $\theta$ are pan and tilt angle, respectively In one embodiment, the camera may be installed to oversee an area with a tilt angle, $\theta$. It is located at the world coordinate position (0, 0, h). h is the height of the camera. As illustrated in FIG. 3A, the camera is facing Y-direction. In addition, FIG. 3A shows a point (u, v) on the image coordinate and its projected point on ground coordinate, C(x, y, 0). The image coordinate is on the image plane (U, V). The origin of the coordinate is at the center of the image plane, that is, U is from −width/2 to width/2, and V is from −height/2 to height/2.

Figure 3B:
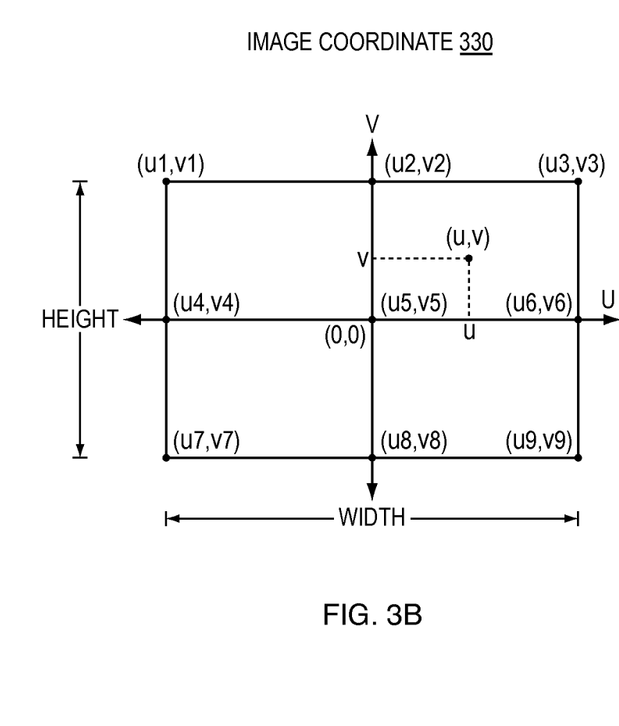
FIG. 3B is a graph diagram illustrating one embodiment of mapping using a coordinate system for window blanking.
Figure 3C:
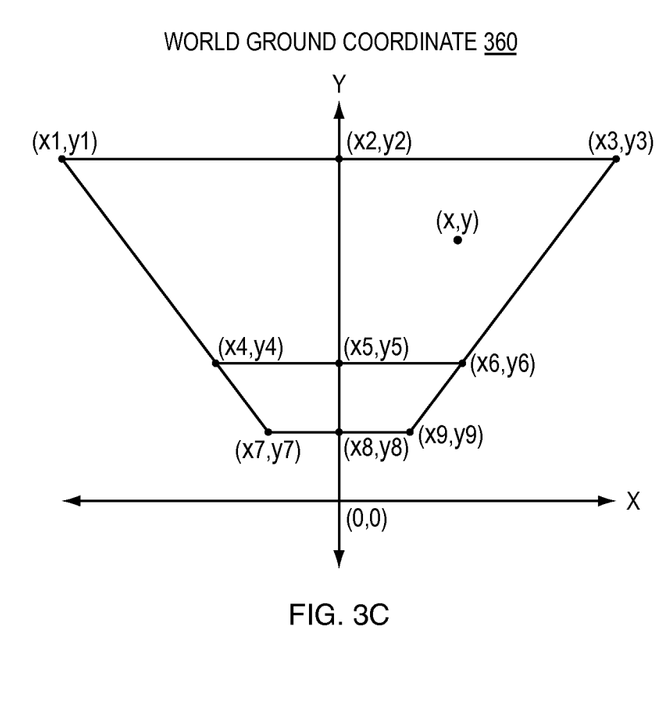
FIG. 3C is a graph diagram illustrating one embodiment of mapping using a coordinate system for window blanking.

FIGS. 3B and 3C are graph diagrams 330 illustrating one embodiment of mapping using a coordinate system for window blanking 4. FIGS. 3B and 3C illustrate one mapping from image coordinate to world ground coordinate. Each point in the image coordinate $(u_i, v_i)$ maps to $(x_i, y_i, z)$, for i from 1 to 9. The ground level z value is zero, z is not shown. The point, $(x_i, y_i, z)$, may be referred to as the projected point of $(u_i, v_i)$. In one embodiment, the projected point is the intersection point between the ground level and the line passing through the focal point and point $(u_i, v_i)$.

Figure 4:
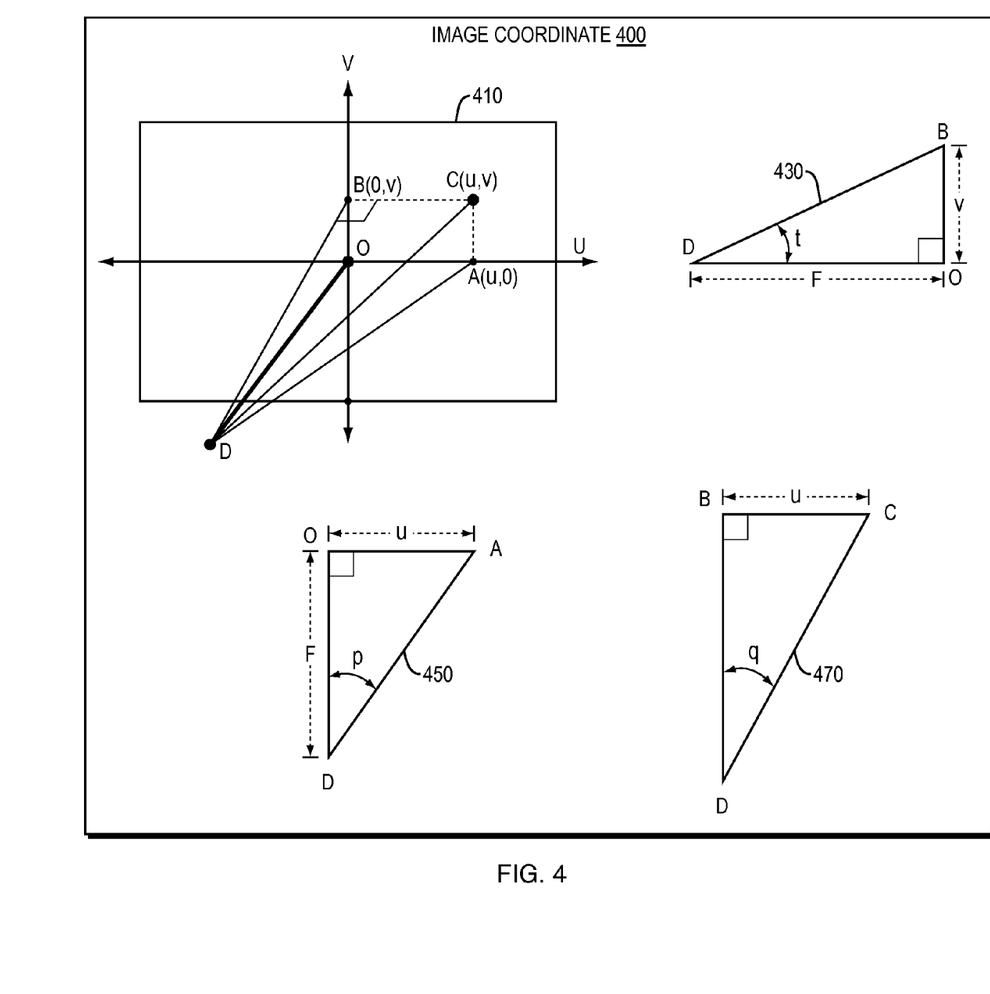
FIG. 4 is a graph diagram illustrating one embodiment of an image coordinate graph for the window blanking.

FIG. 4 is a graph diagram illustrating one embodiment of the image coordinate. As illustrated in FIG. 4, point (u,v) is shown with its corresponding horizontal angle, p, and vertical angle, t, away from the optical center axis. The optical center axis is the line passing through point O, the image center, and point D, the focal point. The length of $\overline{OD}$ is the camera focal length. In addition, FIG. 4 shows the point, B(0, v), and the corresponding point, B(0, y, 0), in world coordinate of FIG. 3A. FIG. 4 also shows the angle, q (or ∠BDC), and its corresponding angle, q (or ∠BDC), in the world coordinate of FIG. 3A. In one embodiment, the variables may be denoted as follows:

Let
$\theta$: tilt angle of camera,
F: focal length (in horizontal direction pixels)
$\alpha$: half of the horizontal field-of-view of camera (in degrees or radians)
$\beta$: half of the vertical field-of-view of camera (in degrees or radians)

$I_w$: image width (in pixels)
$I_h$: image height (in pixels)
R: image sensor aspect ratio (height of image sensor/width of image sensor)

When focal length and $\beta$ are unknown, they can be computed by the formulae:

$$\tan(\alpha) = \frac{I_w}{2 \cdot F}, F = \frac{I_w}{2 \cdot \tan(\alpha)}$$

$$\beta = 2 \cdot \tan^{-1}\left(\frac{R \cdot I_w}{2 \cdot F}\right)$$

If 0°<0, then the tilt angle of the camera center is below the horizon.

$\theta$<0°, then the tilt angle of the camera center is above the horizon.

In one embodiment, the equations may be derived are based on 0°<($\theta$+t)<90° (i.e., the object in the video is on the ground).

Figure 5:
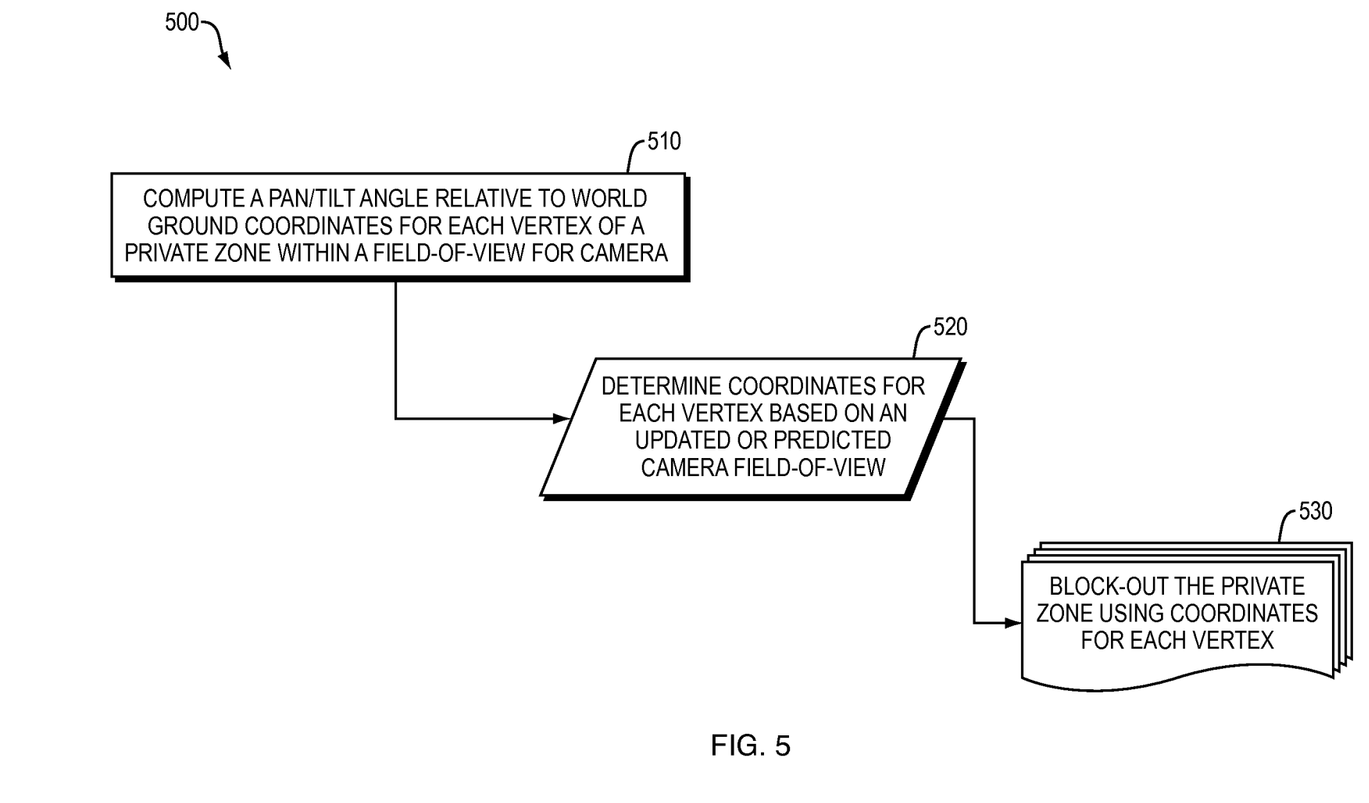
FIG. 5 is a flow diagram illustrating one embodiment of a process for window blanking.

FIG. 5 is a flow diagram illustrating one process for window blanking in the camera system of FIG. 1. According to FIG. 5, the flow diagram 500, may include a process to compute an absolute pan/tilt angle relative to world ground coordinates for each vertex of a privacy zone within a field-of-view for the camera. The process may further include the camera system to determine coordinates for each vertex based on an updated or predicted camera field-of-view 520. In one embodiment, the camera system may block out the privacy zone using the coordinates for each vertex 530.

The process 500 illustrated in FIG. 5 may further include setting a window-blanking privacy zone. In one embodiment, a privacy zone may be set by 1) moving the camera to a location which encompasses the private area and 2) using a GUI to draw a polygon that covers the area to be blocked out. To accomplish this, some assumptions may be made. For example, the PTZ camera is located at ($\phi$,$\theta$,m) position when the privacy zone is drawn. ($\phi$,$\theta$,m) are pan angle, tilt angle, and zooming factor, respectively. This position is called the preset position.

In one embodiment, the privacy zone is designated by a polygon. The privacy zone may be based on the vertices of the polygon, where:
  $(u_i, v_i)$ represent the image coordinates of the vertices of the polygon when camera is at preset, and
  ($\alpha$,$\beta$) are half of the horizontal and vertical field-of-view, respectively, when the PTZ is at preset.

When the camera is moved to a different position, ($\phi'$,$\theta'$, m'), the location and size of the privacy zone in the new image may be different from those in the image of the preset, where:
  $(u_i', v_i')$ are the image coordinates of the vertices of the new polygon when the camera is moved to ($\phi'$,$\theta'$,m'), and
  ($\alpha'$,$\beta'$) are half of the horizontal and vertical field-of-view, respectively, when the PTZ is at ($\phi'$,$\theta'$,m'). $\alpha$ and m are related as follows:

$$\frac{m}{m'} = \frac{\alpha'}{\alpha}$$

As illustrated in FIG. 5, the process may include computing an absolute pan/tilt Coordinate, ($\phi_i$,$\theta_i$), for each vertex. For the image coordinate of each vertex, $(u_i, v_i)$, there is one projected world coordinate, $(x_i, y_i, 0)$. When the camera is centered at world coordinate $(x_i, y_i)$, its pan/tilt angle, $(\phi_i, \theta_i)$, can be computed by the formulae as follows:

$$F = I_w / [2 \cdot \tan(\alpha)]$$

$$v_{i0} = v_i \kappa, \quad \kappa = R \cdot I_w / I_h$$

$$\tan(t_i) = v_{i0} / F$$

$$\tan(q_i) = u_i / \sqrt{F^2 + v_{i0}^2}$$

If $0° < (\theta + t_i) < 90°$, the formulae are as follows:

$$\theta_i = \sin^{-1}(\sin(\theta + t_i) \cdot \cos(q_i))$$

$$\phi_i = \phi + \tan^{-1}\left(\frac{\tan(q_i)}{\cos(\theta + t_i)}\right)$$

If $(\theta + t_i) < 0°$, the formulae are as follows:

$$\theta_i = \theta + t_i$$

$$\phi_i = \phi + q_i$$

If $90° < (\theta + t_i)$, the equation for the pan angle, $\phi_i$, is as follows:

$$t_{i0} = 180 - (\theta + t_i)$$

$$\phi_i = \begin{cases} \phi - \tan^{-1}\left(\frac{\tan(q_i)}{\cos(t_{i0})}\right) + 180, & \text{if } u_i > 0 \\ \phi - 180, & \text{if } u_i = 0 \\ \phi - \tan^{-1}\left(\frac{\tan(q_i)}{\cos(t_{i0})}\right) - 180, & \text{if } u_i < 0 \end{cases}$$

Privacy zones may be computed in a variety of ways. When the camera is relocated to a new location, $(\phi', \theta, m')$, the new image coordinates of the relocated and resized polygon with vertices, $(u_i', y_i')$, can be computed by the formulae as follows:

Re-arrange the difference of the pan angles, $(\phi_i - \phi')$, such that it lies within the range of $[-180°, 180°]$.

$$\Delta = \phi_i - \phi'$$

$$d\phi_i = \begin{cases} \Delta - 360° & \text{if } \Delta > 180° \\ \Delta & \text{if } -180° \leq \Delta \leq 180° \\ \Delta + 360° & \text{if } \Delta < -180° \end{cases}$$

Compute $\tan(t_i')$ as follows:

$$\tan(t_i') = \frac{\tan(\theta_i) - \cos(d\phi_i) \cdot \tan(\theta')}{\cos(d\phi_i) + \tan(\theta_i) \cdot \tan(\theta')}$$

Compute $v_{i0}'$ as follows:

$$v_{i0}' = F \cdot \tan(t_i')$$

$$F = \frac{I_w}{2 \cdot \tan(\alpha')}$$

Compute $u_i'$ as follows:

$$u_i' = \frac{\sin(d\phi_i) \cdot \sqrt{F^2 + (v_{i0}')^2}}{\sqrt{\cos^2(d\phi_i) + \tan^2(\theta_i)}}$$

Compute $v_i'$ as follows:
Either $(t_i' > 90°)$ or $(t_i' < 0°)$ will result in $(\tan(t_i') < 0)$.
If $(|d\phi_i| > 90°)$ and $(\tan(t_i') < 0)$, that is, $(t_i' > 90°)$, then $$v_i' = \text{infinity}$$

else $$v_i' = v_{i0}'/\kappa = v_{i0}' \cdot I_h / (R \cdot I_w)$$

In one embodiment, the noted equations may be derived based on the assumption of $(0° < \theta_i)$. In the case of $(\theta_i \leq 0°)$ or $(\theta' \leq 0°)$, the equations may be modified as follows:

$$v_{i0}' = F \cdot \tan(\theta_i - \theta)$$

$$v_i' = v_{i0}'/\kappa, \quad \kappa = R \cdot I_w / I_h$$

$$u_i' = \sqrt{F^2 + (v_{i0}')^2} \cdot \tan(\phi_i - \phi)$$

To effect the blanking of privacy zones, a scan line polygon fill may be used to block out the video inside the polygon, $(u_i', v_i')$. In general, the window-blanking process sets a privacy zone and computes each vertex of the privacy zone. More specifically, when a privacy zone is set at a specific preset position, $(\phi, \theta, m)$, the pan/tilt angle, $(\phi_i, \theta_i)$, for each vertex is computed and recorded. In one embodiment, the camera may be moved to a different position, $(\phi', \theta', m')$ and the image coordinate for each vertex associated with the different position, $(u_i', v_i')$, are computed. The new set of vertices, $(u_i', v_i')$, are used to block out the privacy zone. This process may be repeated when the camera position is adjusted.

Figure 6:
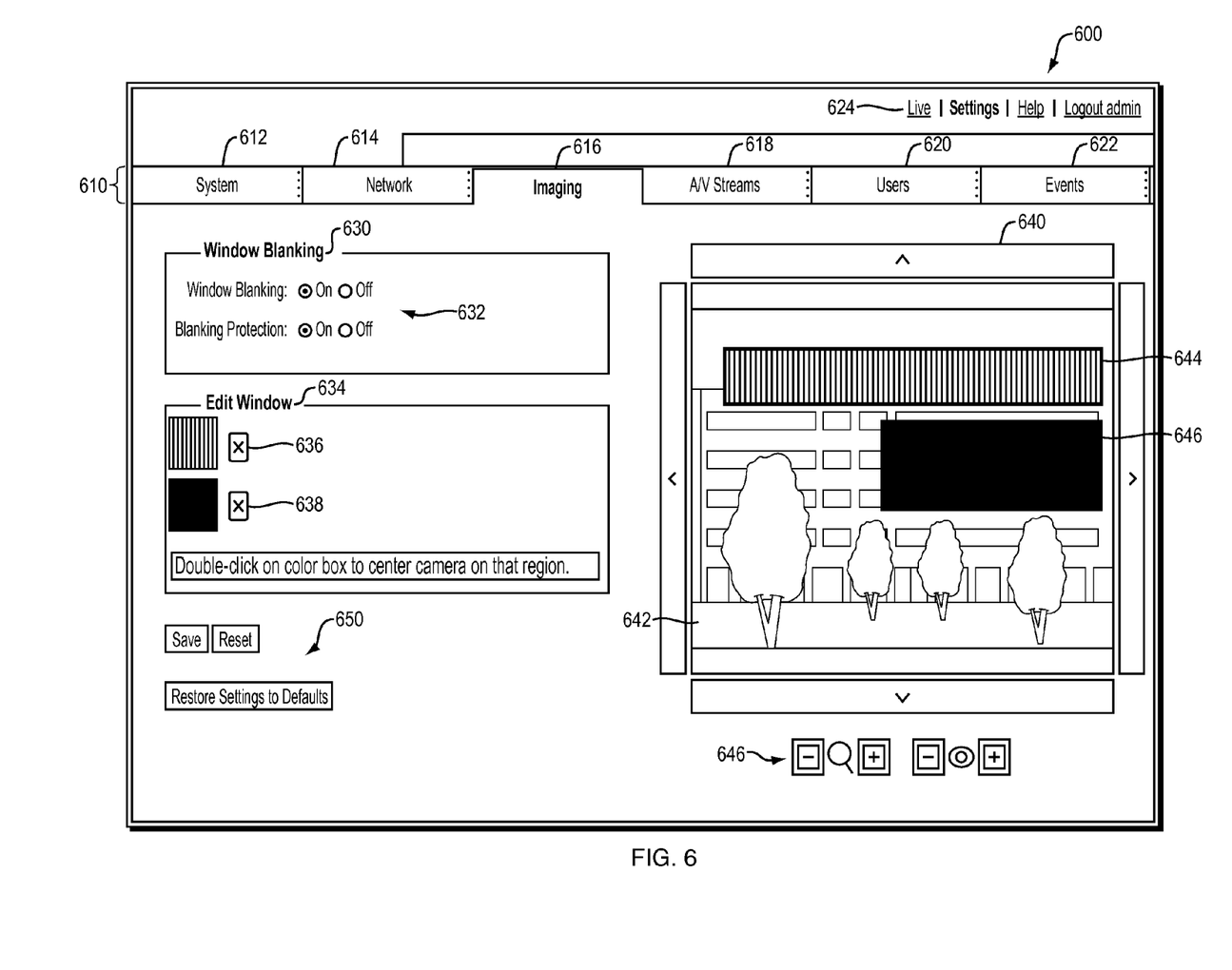
FIG. 6 is a graphical representation of one embodiment for a user interface for a window blanking system.

FIG. 6 illustrates one embodiment of a user interface for interacting with the window blanking system. The user interface 600 illustrated in FIG. 6 may include a navigation menu 610 and an account menu 624. The navigation menu may include a system tab 612, a network tab 614, an imaging tab 616, an audio/visual streams tab 618, a users tab 620, and/or an events tab 622. The account menu 624 may include a live tab, a settings tab, a help tab, and/or a logout tab. Under the imaging tab 616, the interface may display a window blanking controls box 630. The window blanking controls box may include a window blanking on off toggle and or a window blanking protection toggle 632.

The imaging tab may further present an edit window box 634. The edit window box may include one or more icons for adjusting editable privacy zone(s) 636 and 638. The imaging tab 616 may also include a preview 642 of the field-of-view for a camera, with the editable privacy zones, 644, 646, available. As illustrated, privacy zone 636 runs across the top level of the building in the preview image presented. Privacy zone 638 runs along the bottom middle right-hand side portion of the building. The interface also includes a navigation control which allows the user to control the camera. For example, selecting the up bar 640 may translate to a pan/tilt/zoom command transmitted to the camera. Additional commands 646 running along the bottom of the preview window 642 may include a zoom in command, zoom out command, a focus near command, and/or a focus far command. In one embodiment, a privacy zone may be created by selecting the On option for window blanking, and drawing (with an input device, e.g., mouse, stylus, finger/touch screen) a window in the preview pane 642. The drawn privacy zone may be further resized, moved labeled, and/or center profiled.

Figure 7:
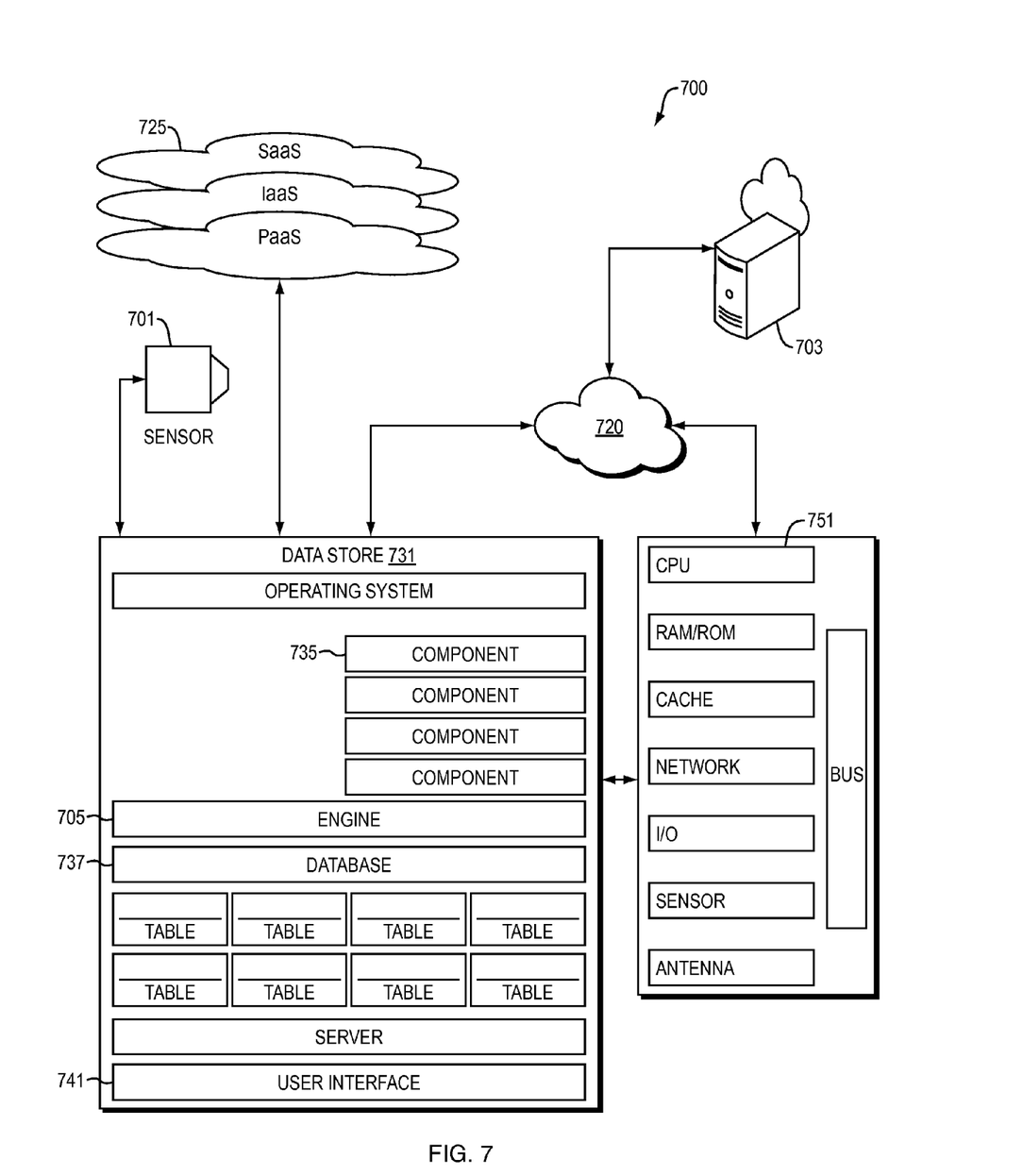
FIG. 7 is a schematic diagram illustrating one embodiment of a camera system for window blanking.

FIG. 7 is a block diagram illustrating embodiments of a Window Blanking (WB) Platform 700. In this embodiment, the WB Platform may serve to aggregate, process, store, search, serve, identify, instruct, generate, match, and/or facilitate interactions with a computer. Computers employ processors to process information; such processors may be referred to as central processing units (CPU) 751. CPUs use communicative circuits to pass binary encoded signals acting as instructions to enable various operations. These instructions may be operational and/or data instructions containing and/or referencing other instructions and data in various processor accessible and operable areas of memory. Such instruction passing facilitates communication between and among one or more sensors, cameras, one or more instances of the privacy engine, one or more privacy engine components, as well as third party applications. Should processing requirements dictate a greater amount speed and/or capacity, distributed processors (e.g., Distributed WB) mainframe, multi-core, parallel, and/or super-computer architectures may similarly be employed. Alternatively, should deployment requirements dictate greater portability, mobile device(s), tablet(s) Personal Digital Assistants (PDAs) may be employed.

The sensor device 701 may include an image sensor, depth sensor, motion detector, thermal camera, visible spectrum camera, fixed surveillance camera, a pan/tilt/zoom (PTZ) camera, or the like. The sensor device may include transceivers connected to antenna(s), thereby effectuating wireless transmission and reception of various instructions over various protocols; for example the antenna(s) may connect over Wireless Fidelity (WiFi), BLUETOOTH, Wireless Access Protocol (WAP), Frequency Modulation (FM), or Global Positioning System (GPS). Such transmission and reception of instructions over protocols may be commonly referred to as communications. In one embodiment, the WB Platform may facilitate communications through a network 720 between or among the sensor device and peripheral devices, such as user input devices (e.g., mouse, keyboard stylus, touch screen, or the like).

Depending on the particular implementation, features of the WB Platform and components of the privacy engine may be achieved by implementing a specifically programmed microcontroller. Implementations of the WB Platform and functions of the components of the privacy engine include specifically programmed embedded components, such as: Application-Specific Integrated Circuit ("ASIC"), Digital Signal Processing ("DSP"), Field Programmable Gate Array ("FPGA"), and/or the like embedded technology. For example, any of the WB Platform Engine Set 705 (distributed or otherwise) and/or features may be implemented via the microprocessor and/or via embedded components; e.g., via ASIC, coprocessor, DSP, FPGA, and/or the like. Depending on the particular implementation, the embedded components may include software solutions, hardware solutions, and/or some combination of both hardware/software solutions. For example, WB Platform features discussed herein may be achieved through implementing FPGAs, which are a semiconductor devices containing programmable logic components called "logic blocks", and programmable interconnects.

Logic blocks and interconnects can be programmed by the customer or designer, after the FPGA is manufactured, to implement any of the WB Platform or privacy engine components. An FPGA's logic blocks can be programmed to perform the operation of basic logic gates such as AND, and XOR, or more complex combinational operators such as decoders or mathematical operations. FPGA logic blocks may also include memory elements. These memory elements may allow development of the components of the privacy engine regular FPGAs for migration to a fixed version that more resembles ASIC implementations. Storage interfaces, e.g., data store 731, may accept, communicate, and/or connect to a number of storage devices such as, but not limited to: storage devices, removable disc devices, such as Universal Serial Bus (USB), Solid State Drives (SSD), Random Access Memory (RAM), Read Only Memory (ROM), or the like.

Peripheral devices may be connected and/or communicate to I/O and/or other facilities of the like such as network interfaces, storage interfaces, directly to the interface bus, system bus, the CPU, and/or the like. Peripheral devices may be external, internal and/or part of WB Platform. Peripheral devices may include: antenna, audio devices (e.g., line-in, line-out, microphone input, speakers, etc.), cameras (e.g., still, video, webcam, etc.), external processors (for added capabilities; e.g., crypto devices), printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

The memory may contain a collection of program and/or database components and/or data such as, but not limited to: operating system component, server component, user interface component 741; database component 737 and component collection 735. These components may direct or allocate resources to privacy engine components. A server 703 may include a stored program component that is executed by a CPU. The server may allow for the execution of privacy engine components through facilities such as an API. The API may facilitate communicate to and/or with other components in a component collection, including itself, and/or facilities of the like. In one embodiment, the server communicates with the WB Platform database 737, component collection 735, a web browser, a remote client, or the like. Access to the WB Platform database may be achieved through a number of database bridge mechanisms such as through scripting languages and through inter-application communication channels. Computer interaction interface elements such as check boxes, cursors, menus, scrollers, and windows similarly facilitate access to privacy engine components, capabilities, operation, and display of data and computer hardware and operating system resources, and status.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device 703. For example, a non-transient machine-readable medium may include read only memory (ROM); random access memory (RAM); magnetic disk storage media; optical storage media; flash memory devices; and others.

While this invention has been particularly shown and described with references to example embodiments thereof, it will be understood by those skilled in the art that various changes in form and details may be made therein without departing from the scope of the invention encompassed by the appended claims.

What is claimed is:

1. A method of window-blanking for a pan/tilt/zoom camera, the method comprising:
    obtaining a panoramic image from the camera;
    enabling a user to interact with the panoramic image as an interface for defining a privacy zone through a defined input mode;
    providing a selection of layers including a panoramic image layer, map layer, hybrid panoramic image map layer, and annotations layer with the panoramic image interface;
    computing a pan/tilt angle relative to world ground coordinates for each vertex of the privacy zone within a field-of-view of the camera;
    determining coordinates for each vertex based on an updated or predicted camera field-of-view; and
    blocking-out the privacy zone using the coordinates for each vertex.

2. The method of claim 1, further comprising:
    calculating the pan/tilt angles for each vertex of the privacy zone based, at least in part, on an internal camera location and an external camera location, wherein the internal camera location is defined by a pan attribute, tilt attribute, and zoom attribute and the external camera location is defined relative to the world ground coordinate by an x-attribute, y-attribute, and height attribute.

3. The method of claim 2, further comprising determining an adjusted pan/tilt angle for each vertex of the privacy zone.

4. The method of claim 3, further comprising generating a predictive pan/tilt adjustment angle for each vertex in the privacy zone as a function of the adjusted pan/tilt angle.

5. The method of claim 2, wherein blocking-out the privacy zone includes effecting color at a display location by a change to values received from an image sensor.

6. The method of claim 5, wherein effecting the color at the display location includes applying a scanline polygon fill to form a privacy representation in a location within an image where a representation of objects in the privacy zone would otherwise have been located or adding or removing color or intensity within the location.

7. The method of claim 1, further comprising obtaining a privacy zone demarcation input for blocking-out the privacy zone.

8. The method of claim 7, further comprising enabling a mapping application to obtain the privacy zone demarcation input.

9. The method of claim 1, further comprising:
    enabling the user to engage in a selection mode, draw mode and gesture mode as available input modes for the panoramic image interface; and
    storing the vertices of input received from the panoramic image interface to enable blocking-out of the privacy zone.

10. A window-blanking image sensor system, comprising:
    an image sensor;
    a computer memory storing program instructions in communication with the image sensor, the program instructions being loadable and executable by a processor, and when executed, cause the processor to:
        compute an absolute pan/tilt angle relative to world ground coordinates for each vertex of a privacy zone within a field-of-view for the image sensor;
        determine coordinates for each vertex based on an updated or predicted image sensor field-of-view; and
        block-out the privacy zone using the coordinates for each vertex; and
    a privacy engine stored in the computer memory, wherein the privacy engine includes a mapping component configured to:
        receive a panoramic image from the image sensor;
        enable a user to interact with the panoramic image as an interface for defining the privacy zone through a defined input mode; and
        provide a selection of layers including a panoramic image layer, a map layer, a hybrid panoramic image map layer, and an annotations layer with the panoramic image interface.

11. The system of claim 10 wherein the privacy engine includes a window blanking component, a coordinates component, a mapping component, a camera component, an encoder component, or a user interface component.

12. The system of claim 10 wherein the privacy engine is accessible through a remote client device.

13. The system of claim 10, wherein the privacy engine simultaneously adjusts the privacy zone with movement of the image sensor.

14. The method of claim 1, wherein blocking-out the privacy zone using the coordinates for each vertex includes applying window-blanking at the camera.

15. The method of claim 14, wherein applying window-blanking at the camera includes sending from the camera data stream before encoding or compressing the data stream.

16. The method of claim 15 wherein the data stream is an analog data stream or a digital data stream.

17. The method of claim 1, wherein calculating pan/tilt angles includes considering ground coordinates, rotating or translating camera coordinates, redactions from one or more users.

18. The method of claim 1, wherein determining coordinates includes calculating no coordinate transformation, image coordinates or pan/tilt/zoom coordinates.

19. A method of enabling window-blanking by a camera, comprising:
    obtaining a panoramic image for a pan/tilt/zoom camera;
    enabling a user to interact with the panoramic image as an interface for defining the privacy zone through a defined input mode and to define at least one blanking zone within the panoramic image;
    providing a selection of layers including a panoramic image layer, map layer, hybrid panoramic image map layer, and annotations layer with the panoramic image interface; and
    storing vertices of the at least one blanking zone in a manner that enables blanking of the at least one blanking zone during imaging by the camera.

* * * * *